(12) United States Patent
Lynch

(10) Patent No.: US 7,296,033 B1
(45) Date of Patent: Nov. 13, 2007

(54) METHOD FOR PROMOTING SELLING OF SELLER ITEMS ON AN ONLINE AUCTION SITE

(75) Inventor: Gerard Alan Lynch, Newbury Park, CA (US)

(73) Assignee: AuctionHelper.com, Newbury Park, CA (US)

(*) Notice: Subject to any disclaimer, the term of this patent is extended or adjusted under 35 U.S.C. 154(b) by 895 days.

(21) Appl. No.: 09/728,356

(22) Filed: Dec. 1, 2000

Related U.S. Application Data

(60) Provisional application No. 60/230,375, filed on Sep. 6, 2000, provisional application No. 60/219,596, filed on Jul. 20, 2000.

(51) Int. Cl.
*G06F 17/00* (2006.01)

(52) U.S. Cl. ............... 707/104.1; 707/101; 707/102; 707/10; 707/3

(58) Field of Classification Search ............ 707/1, 707/3, 104.1, 100, 102; 705/18, 14, 26, 1, 705/37; 709/219
See application file for complete search history.

(56) References Cited

U.S. PATENT DOCUMENTS

| | | | |
|---|---|---|---|
| 3,604,850 A | 9/1971 | Eckenbrecht et al. | |
| 3,751,593 A | 8/1973 | Rychlewski et al. | |
| 4,769,796 A | 9/1988 | Levine | 368/29 |
| 4,949,193 A | 8/1990 | Kiesel | |
| 5,745,109 A | 4/1998 | Nakano et al. | |
| 5,794,207 A * | 8/1998 | Walker et al. | 705/1 |
| 5,799,157 A | 8/1998 | Escallon | |
| 5,835,896 A | 11/1998 | Fisher et al. | |
| 5,890,138 A | 3/1999 | Godin et al. | |
| 5,902,352 A | 5/1999 | Chou et al. | 709/102 |
| 6,006,201 A | 12/1999 | Berent et al. | 705/27 |
| 6,058,417 A | 5/2000 | Hess et al. | 709/219 |
| 6,085,176 A | 7/2000 | Woolston | 705/37 |
| 6,157,410 A | 12/2000 | Izumi et al. | |

(Continued)

FOREIGN PATENT DOCUMENTS

JP 60093570 A 5/1985

(Continued)

OTHER PUBLICATIONS

Unknown, Car auction reaches into space, Automotive News, Nov. 25, 1991, p. 6 (from Dialog File 16).

(Continued)

*Primary Examiner*—Sana Al-Hashemi
(74) *Attorney, Agent, or Firm*—Anthony B. Diepenbrock, III; Dechert LLP

(57) ABSTRACT

A method of promoting for bid or sale of auction items of a seller on an auction site. In an item description of an item available from a seller on the auction site, a pointer is embedded. The pointer points to a related item offered for bid or sale on the auction site. When the user accesses the item description, the auction site causes an access to a facilitating server using the pointer. This, in turn, causes the facilitating server to produce a list of related items available by the same seller on the auction site. The list is presented to the user so that the user can bid on or purchase the related items. In this way, a specific seller's items can be promoted to bidders or purchasers using the auction site.

33 Claims, 13 Drawing Sheets

U.S. PATENT DOCUMENTS

| | | | |
|---|---|---|---|
| 6,161,099 | A | 12/2000 | Harrington et al. ............ 705/37 |
| 6,240,396 | B1* | 5/2001 | Walker et al. ................. 705/26 |
| 6,243,691 | B1 | 6/2001 | Fisher et al. .................. 705/37 |
| 6,292,188 | B1 | 9/2001 | Carlson et al. |
| 6,341,353 | B1* | 1/2002 | Herman et al. ............. 713/201 |
| 6,405,175 | B1* | 6/2002 | Ng .............................. 705/14 |
| 6,415,320 | B1* | 7/2002 | Hess et al. ................... 709/219 |
| 6,427,140 | B1 | 7/2002 | Ginter et al. |
| 6,473,401 | B1 | 10/2002 | Kong et al. |
| 6,496,857 | B1 | 12/2002 | Dustin et al. ............... 709/219 |
| 6,523,037 | B1* | 2/2003 | Monahan et al. ............. 707/10 |
| 6,587,831 | B1 | 7/2003 | O'Brien ......................... 705/8 |
| 6,636,219 | B2 | 10/2003 | Merrick et al. |
| 6,714,960 | B1 | 3/2004 | Bitar et al. ................. 709/103 |
| 6,732,161 | B1 | 5/2004 | Hess et al. ................... 709/219 |
| 6,785,660 | B1 | 8/2004 | Fedor et al. .................. 705/37 |
| 2001/0039524 | A1 | 11/2001 | Harrison Jr. et al. ......... 705/35 |
| 2002/0077930 | A1 | 6/2002 | Trubey et al. ................ 705/26 |
| 2002/0143634 | A1* | 10/2002 | Kumar et al. ................. 705/18 |
| 2003/0093355 | A1 | 5/2003 | Issa ............................. 705/37 |
| 2006/0242056 | A1 | 10/2006 | Walker et al. ................ 705/37 |

FOREIGN PATENT DOCUMENTS

| | | |
|---|---|---|
| JP | 01100591 A | 4/1989 |
| JP | 05210085 A | 8/1993 |
| JP | 11288253 A | 10/1999 |

OTHER PUBLICATIONS

Unknown, California computer auctions no boon for bargain hunter, San Jose Mercury News, Sep. 13, 1993 (From Dialog File 609).

From Dialog® File 610, Onsale: Onsale brings thrill of auctions and bargain hunting online: unique Internet retail service debuts with week-long charity auction for the computer museum in Boston, Business Wire, May 22, 1995.

USPTO Office Action mailed Oct. 7, 2005 on U.S. Appl. No. 10/010,993.

"Lot21 Has Done It Again!: Pushing Rich Media to New Levels of Interactivity with Real-Time Auction Information," PRNewswire/NEWSdesk, May 25, 1999, retrieved [online] from the Internet at http://www.findwealth.com/lot-has-done-it-again-55510pr.html [printed: 01 Oct. 1, 2005].

"Auctiva: Powerful solutions for online sellers; Help: Showcase Frequently Asked Questions (FAQ)," Dec. 1, 2000, retrieved [online] from the Internet at http://web.archive.org/web/20001201225300/auctiva.com/help/sh FAQ.asp [printed: Oct. 1, 2005].

Steiner, Ina: "Vendio Announces New Merchandising Tool and Positive Financials," AuctionBytes.com, Apr. 15, 2004, http://www.auctionbytes.com/cab/abn/y04/m04/i15/s01 [ printed: Oct. 2, 2005].

"Auctiva: Powerful solutions for online sellers: Press Room: Auctiva News: Auctiva launches flagship service with Auctiva Showcase," Auctiva.com, Oct. 5, 2000, retrieved [online] from the Internet at http://web.archive.org/web/20010620195031/auctiva.com/news/re120001005.asp [printed: Oct. 2, 2005].

Auctiva 1, "Auctiva Showcase Rapidly Captures Significant Market Share with One Million Listings in First Sixty Days," *Business Wire,* Dec. 13, 2000.

Auctiva 2, "Auctiva Launches Flagship Service with Showcase," *Auctiva News,* Oct. 5, 2000.

Auctiva 3, http://web.archive.org/web/20010607125055/auctiva.com/products/showcase.asp, dated Jun. 7, 2001.

Auctiva 4, Mike Cleary, "Auction Service Provides Bid to Line Up Sellers," *Inter@active Week,* dated Sep. 26, 2000.

Auctiva 5, http://web.archive.org/web/20000707014738/www.auctiva.com/products/software.asp, dated Jul. 7, 2000.

USPTO Office Action mailed Mar. 22, 2007 in U.S. Appl. No. 10/010,993.

\* cited by examiner

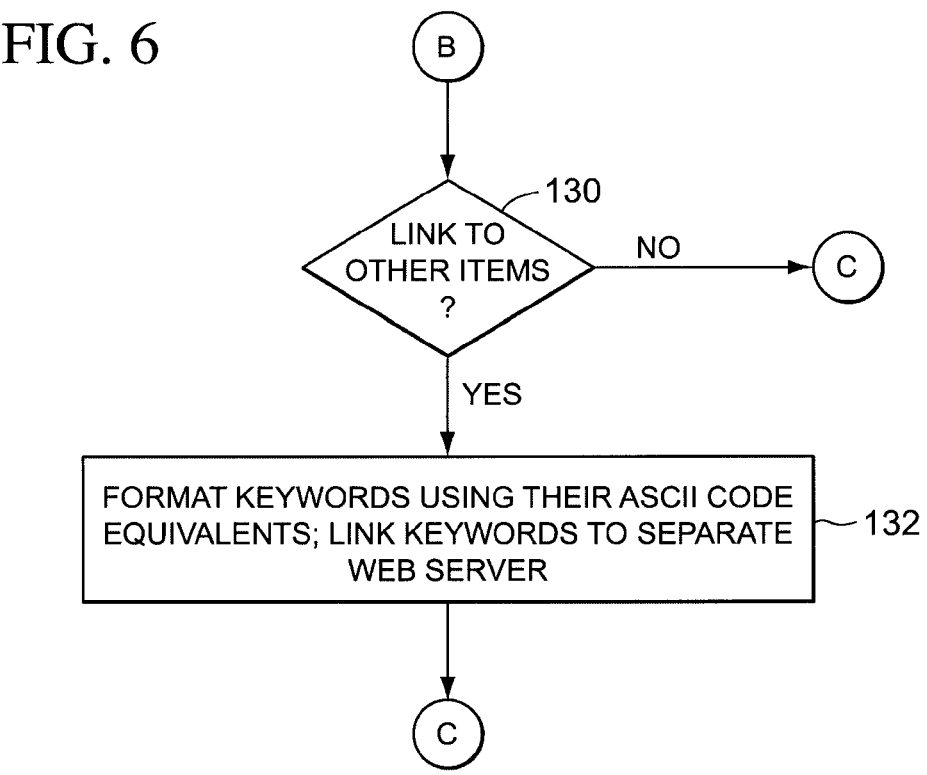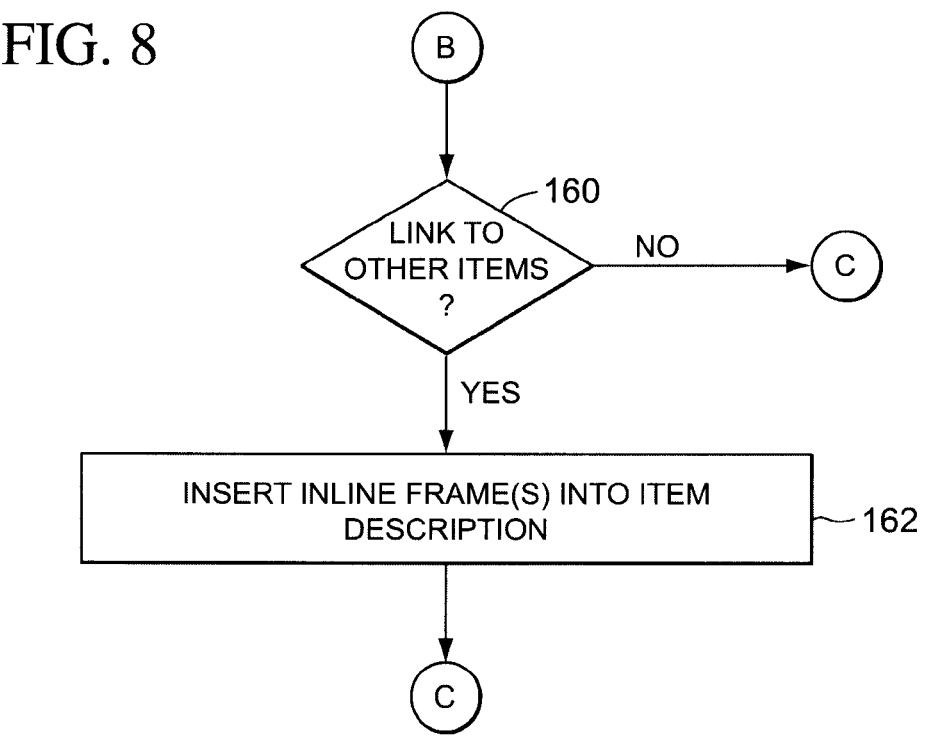

METHOD FOR PROMOTING SELLING OF SELLER ITEMS ON AN ONLINE AUCTION SITE

CROSS-REFERENCES

This application is related to currently co-pending U.S. Application Ser. No. 10/010,993 filed Nov. 12, 2001, and titled "Method For Presenting Related Items For Auction."

The present application claims priority from U.S. Provisional Application Ser. No. 60/230,375, filed Sep. 6, 2000, entitled "System and Method for Automating Listing and Re-Listing of Auction Items", and U.S. Provisional Patent Application Ser. No. 60/219,596, filed Jul. 20, 2000, entitled "System and Method for Automating Listing and Re-Listing of Auction Items".

BACKGROUND

1. Field of the Invention

The present invention relates generally to auction systems over a computer network and more specifically to assisting users to more efficiently list and re-list items for auction over a computer network, such as the Internet.

2. Description of the Related Art

FIG. 1A shows a system setting in which on-line auction systems currently operate. A computer network 10, such as the Internet, connects the computer systems of sellers and bidders 12–14 to one or more auction servers 16–18. The auction servers 16–18 host an auction site, which receives items for sale, lists them for access by the computer systems of the sellers and bidders 12–14, and conducts an auction to determine the winning bidder.

FIG. 1B shows a representative computer system such as those depicted in FIG. 1A. The various components, such as the central processor 23, the memory subsystem 24, the disk interface 25, the I/O subsystem 26 and the communications interface 27, of the computer system are interconnected via system bus 22. The central processor 23 executes programs that are stored in memory subsystem 24. The disk interface 25 is instrumental in transferring information between permanent storage (such as a disk) and the memory subsystem 24. The communications interface 27 is instrumental in transferring data between a network (such as the public switched telephone network and/or a local network) and the memory subsystem 24 via the system bus 22. The I/O subsystem 26 is instrumental in transferring data from a keyboard or pointer device (such as a mouse) to the central processor 23 or the memory subsystem 24 via the system bus and in transferring data from the memory subsystem 24 or central processor 23 to a display device.

Returning to FIG. 1A, sellers list items for sale on the auction system 16–18 of FIG. 1A and set auction parameters such as the starting time and date of the auction, the duration of the auction, the starting bid and bid increments. Buyers bid on items during an open auction for the item and are notified whether or not their bid is the highest bid. At the end of the auction the winning bidder, if any, is notified by email via the computer network and the seller and buyer then contact each other directly to complete the transaction. The seller must deliver the item to the buyer and the buyer must pay for the item in accordance with the terms of the auction.

FIG. 2 shows a flow chart of the listing process of current on-line auction systems. Given the setting shown in FIG. 1A, a seller lists an item for sale on the auction site, in step 30, by first registering seller information at the site including a user id and password. Next, in step 32, the seller accesses an item listing form from the auction site and provides, in step 34, item information and auction parameter information. Item information that the seller provides to the form includes a title and a standalone description of the item; the auction parameter information includes the duration of the auction and the minimum bid, and forms of acceptable payment if a sale occurs. A standalone description of the item means that the description does not have any links to any other item currently listed by the seller. In step 36, the seller obtains an item verification document from the auction site. This document contains a summary of the information provided by the seller in the listing form along with an item id and an item key. For one auction site, the item id is a nine digit number and the item key is a unique sequence of 35 characters. After checking the item verification document, the seller then submits a listing confirmation, in step 38. This action causes the auction site to list the item, in step 40, using the assigned item number and item key and then to charge the seller's account, in step 42, determined from the user id, a listing fee for the item. The listing fee is typically in the range of about $0.25 to $2.00 per item. Thus, it is apparent that listing an item for sale on the auction site is a manual process, involving several, time-consuming interactive steps with the auction site.

If a listed item does not sell during the auction period, the seller has the choice of re-listing the item for sale. The seller is charged a listing fee to re-list the item, however, a credit is applied against this fee if the item is re-listed using the item number and unique key that were used when the item was first listed and the item is sold after being re-listed.

FIG. 3 shows a flow chart of the re-listing process of current on-line auction systems. In step 50, the seller accesses a previously listed item at the auction site. This causes the auction site to send a re-listing form with filled-in information to the seller, in step 52, where the filled-in information is obtained from the information provided when the item was originally listed. In step 54, the seller makes changes to the item description and possibly to the auction parameters. For example, the seller may change the minimum bid or bid increments and improve the description of the item. Upon submitting the listing form back to the auction site, the seller obtains an item verification document, in step 56, from the auction site. The item verification document now contains the item description and auction parameters along with the original item number, the original key, a new item number and new key for re-listing the item, the user id, and password. Submitting the listing confirmation to the auction site, in step 58, causes the site to list the item, in step 60, and charge the listing fee to the seller's account, in step 62. If the re-listed item is sold, as determined in step 64, then the auction site issues a listing fee credit to the seller's account in step 66.

While the process described above is simple and convenient for sellers who list a few items for sale, there are serious deficiencies for sellers who wish to list hundreds or even thousands of items. One deficiency is the time it takes to manually list an item, say a few minutes. To list a thousand items would take about 16 hours. This is too great an expenditure of time to be practicable for the seller. Another aspect of this deficiency is that it is extremely difficult to synchronize the advertising of the items for sale in a trade publication or other advertising medium with their listing on the auction site because the time to list the items on the site may stretch over such a long time period as to make unpredictable the date and time any item is up for sale.

Another deficiency concerns the re-listing of items that did not sell. Not only is there is an extraordinary expenditure of time required to re-list the many items but the seller must use the same item number and key or lose the re-listing fee credit, which for thousands of items can amount to thousands of dollars.

Yet another deficiency is that, when the seller has multiple items listed for sale, the standalone description prohibits links to other items that the seller has listed. This prevents the seller from notifying a potential buyer of the other items for sale, when the buyer finds one of the seller's items.

Therefore, there is a need for an auction assistance system that allows a seller to list and re-list items without spending inordinate amounts of time doing so and without losing credit for re-listed items. Furthermore there is a need for an auction assistance system that allows the seller to inform the buyer of other items the seller has listed.

BRIEF SUMMARY OF THE INVENTION

The present invention is directed to meeting the above needs. In accordance with the present invention, a computerized method of listing an item on an auction site includes selecting an actual item to be listed on the auction site and obtaining actual item description data and actual item auction parameter data for the actual item to be listed; then retrieving a previously obtained and stored item number and item key. Next, confirmation data that includes actual item description data, actual auction parameter data, the retrieved item number, retrieved item key, a user id and a user password is submitted to the auction site to post the item for sale.

Another method, in accordance with the present invention, is used to obtain the item numbers and item keys. First, listing input data containing generic item description data, generic auction parameter data, a user id and a user password is submitted to the auction site. Next, verification data is received from the auction site in response to the listing input data, where the verification data includes the listing input data and an item number and an item key. The item number and item key are then extracted from the verification data and saved for later use. Many item numbers and keys can be obtained prior to listing items for sale at the auction site, thus creating a repository of item numbers and item keys for later use.

A similar process is used to obtain re-listing numbers for items that are listed on the auction site but did not sell during the auction period. The process of listing an item on the auction site can use either a new listing number or a re-listing number, meaning that any item can be listed using a re-listing number. Items that sell using a re-listing number allow the seller to save a listing fee. Many re-listing numbers can be saved in a repository for later use.

Yet another method in accordance with the present invention is a method of presenting to a user on an auction site one or more auction items related to a linking auction item, where the method includes the steps of (i) embedding a pointer in an item description of a linking auction item available by a seller, where the item description when accessed at the auction site causes an access to a facilitating server by means of the embedded pointer, and the linking auction item and the one or more related auction items are items available by the same seller, said auction item being an item available on an auction site, (ii) upon accessing the item description having the embedded pointer, obtaining at the facilitating server a list of item descriptions and item numbers that represent the currently active auction items of the same seller, and (iii) presenting to the user the list of the seller's currently active auction items.

Yet another method in accordance with the present invention includes the steps of (i) encoding search information for one or more related auction items available by a seller, (ii) embedding the encoded search information into a pointer to a facilitating server, where the linking auction item and the one or more related auction items are items available by the same seller, said auction item being an item available on an auction site, (iii) embedding said pointer in an item description of the linking auction item, (iv) upon selection of the linking auction item at the auction site by a user, receiving the encoded search information embedded in the pointer to the facilitating server, (v) automatically decoding the encoded search information embedded in said pointer into a keyword, and (vi) invoking a search engine of the auction site with the keyword as a search parameter to find and present to the user item documents for the one or more related auction items.

An aspect of the present invention is that item descriptions can contain information that enables potential bidders to find other items for sale by the seller without interfering with the search engine of the auction site.

An advantage of the present invention is that a great number of items can be listed on an auction site in a short period of time.

Another advantage of the present invention is that items that did not sell on the first listing can be easily re-listed. Additionally, when re-listing an item, the item, the item description and the auction parameters can be changed regardless of the origin of the first listing. Thus, re-listing item numbers become a resource and the use of this resource can be more easily planned to assure that a re-listed item is one that will sell, thereby assuring the recovery of the re-listing fee.

Another advantage is that listing and re-listing of items can occur at a time that is convenient to the seller. This permits the seller purchase advertisements in trade magazines and to include the item numbers in those advertisements. Thus, when the items are actually listed on the auction site, a demand for the items will already exist.

Yet another advantage of the present invention is that a bidder can be informed of other items that a particular seller has for sale on the auction site without using the auction site search engine for such purposes. This permits the bidder to find related items the seller may have available and increases the likelihood that the bidder will submit a bid for those items.

BRIEF DESCRIPTION OF THE DRAWINGS

These and other features, aspects and advantages of the present invention will become better understood with regard to the following description, appended claims, and accompanying drawings where:

FIG. 6 shows flow chart for creating a linked description in accordance with the present invention;

FIG. 8 shows a flow chart for creating an alternate linked description in accordance with the present invention.

DETAILED DESCRIPTION OF THE INVENTION

Figure 1A:
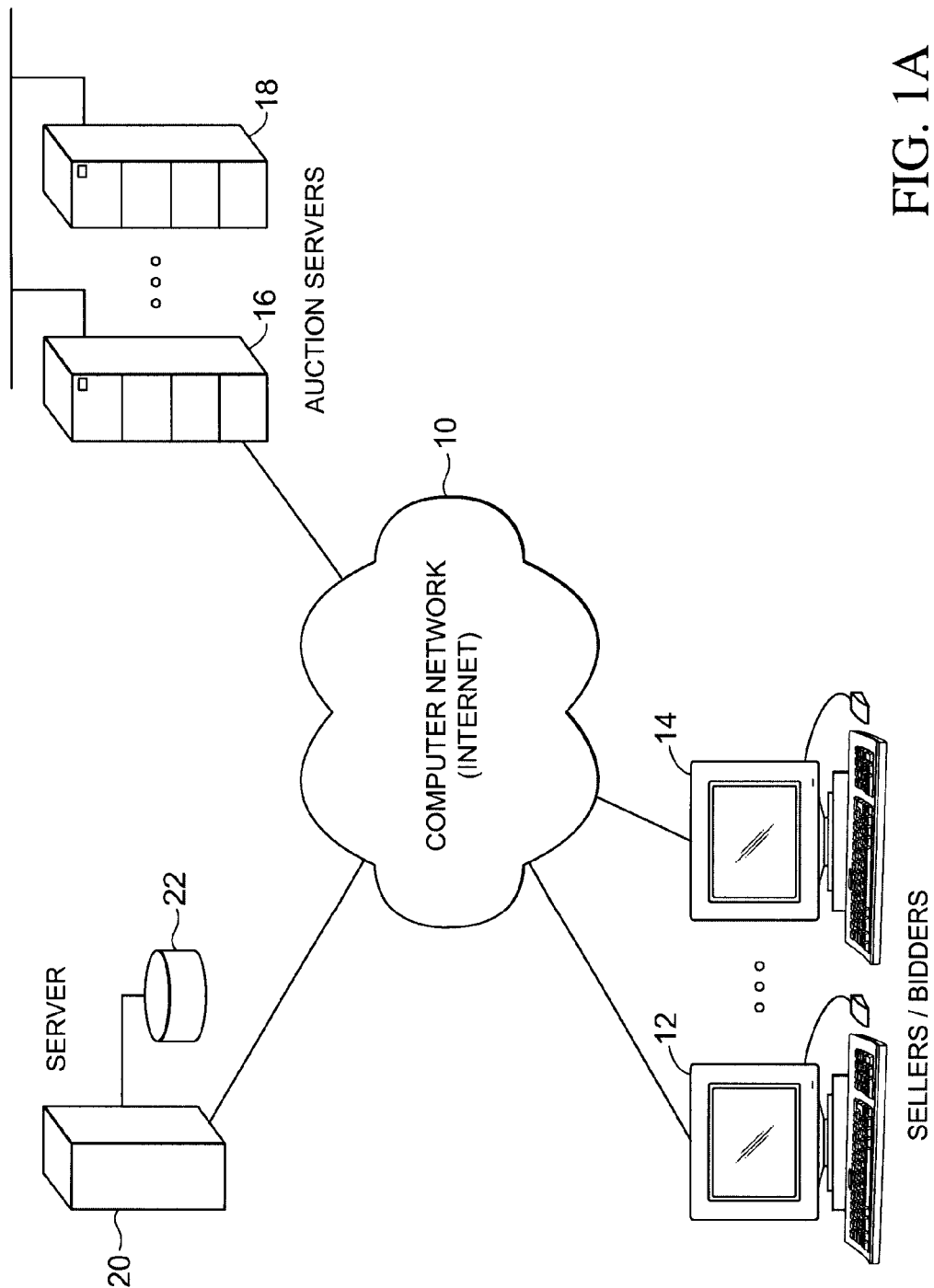
FIG. 1A shows a system setting in which the present invention operates.
Figure 1B:
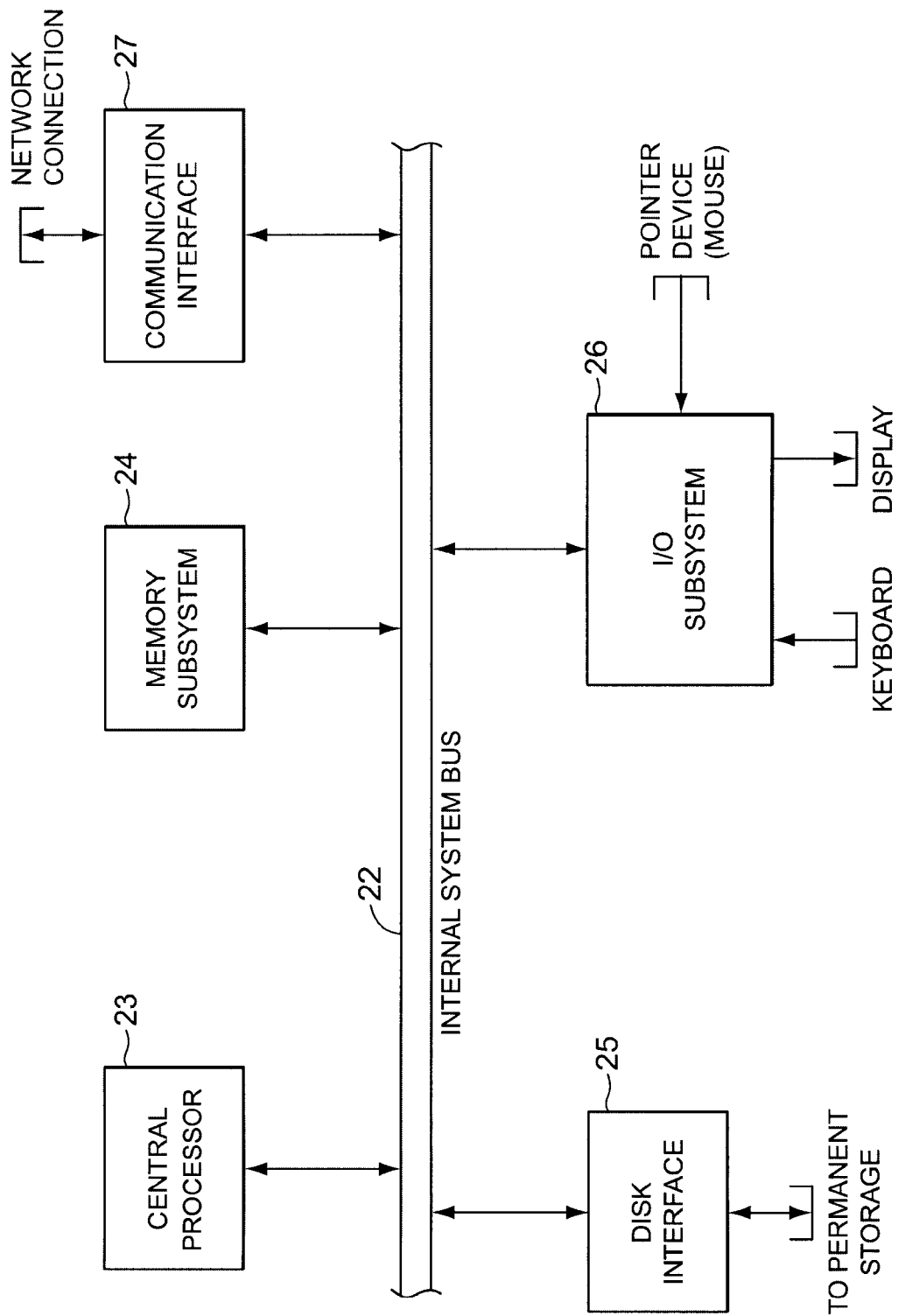
FIG. 1B shows a representative computer system such as is depicted in FIG. 1A.
Figure 2:
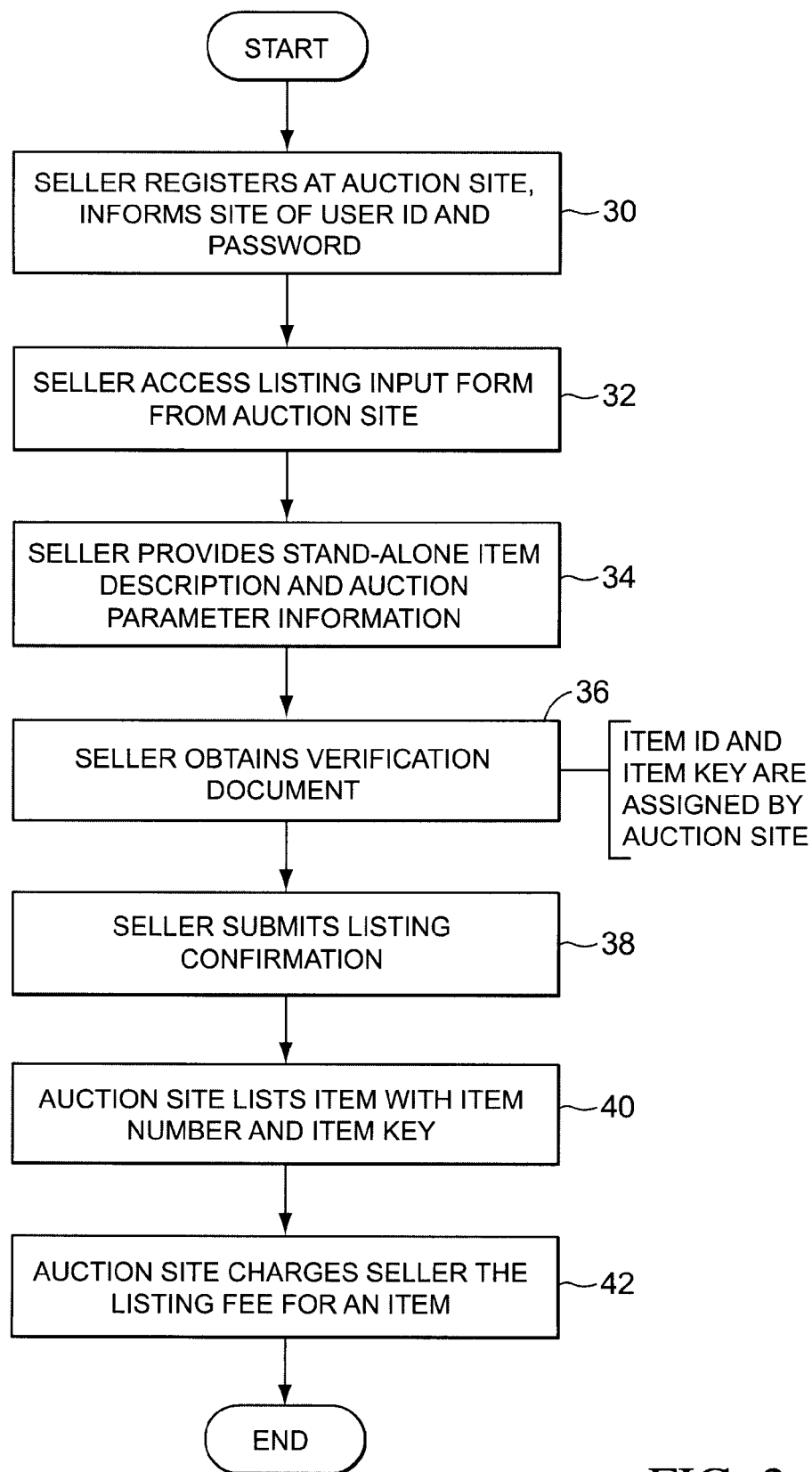
FIG. 2 shows a flow chart of the listing process of current on-line auction systems.
Figure 3:
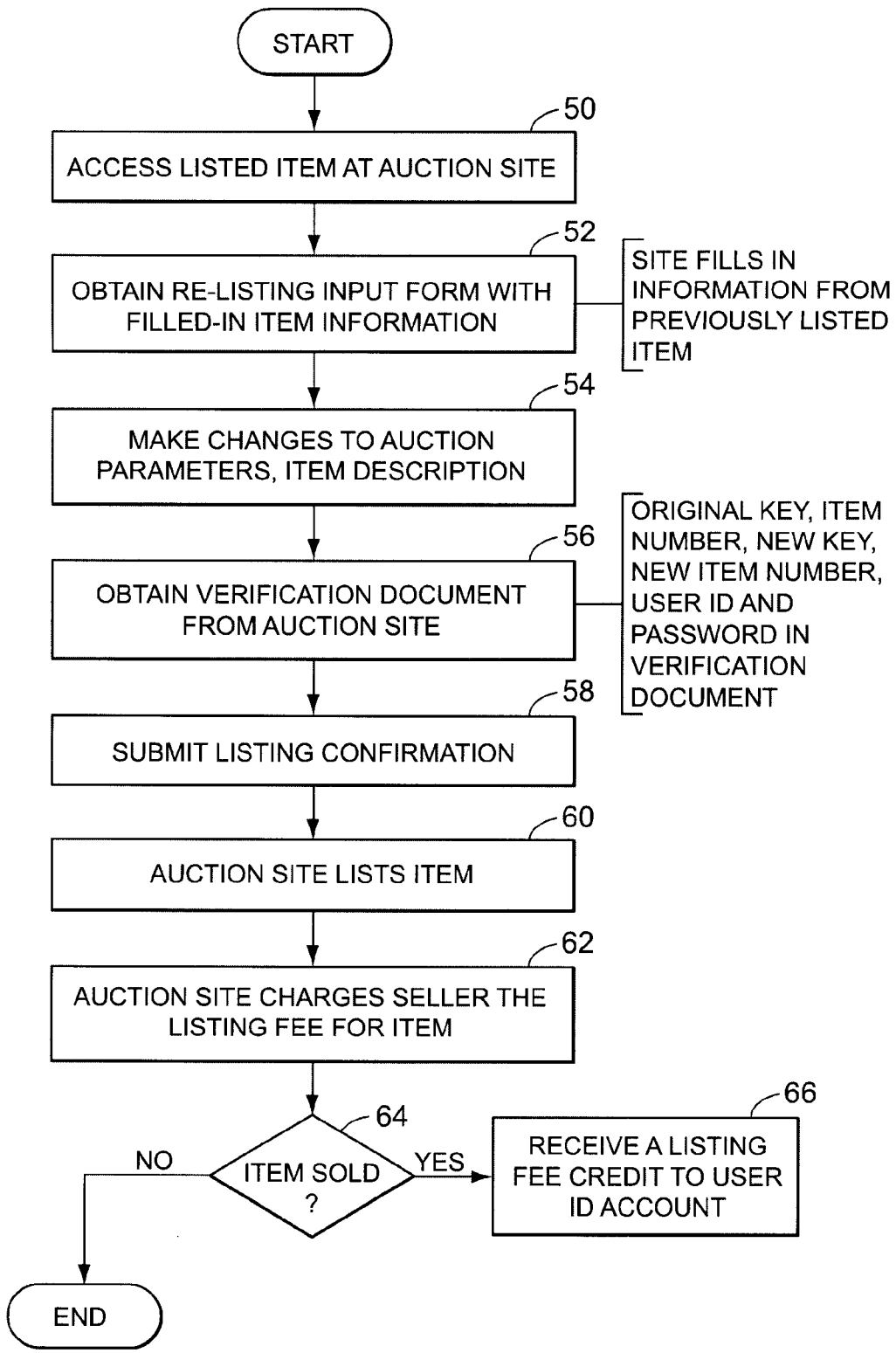
FIG. 3 shows a flow chart of the re-listing process of current on-line auction systems.

An additional server system 20 in FIG. 1 is connected to the Internet and hosts the software of the present invention.

Figure 4A:
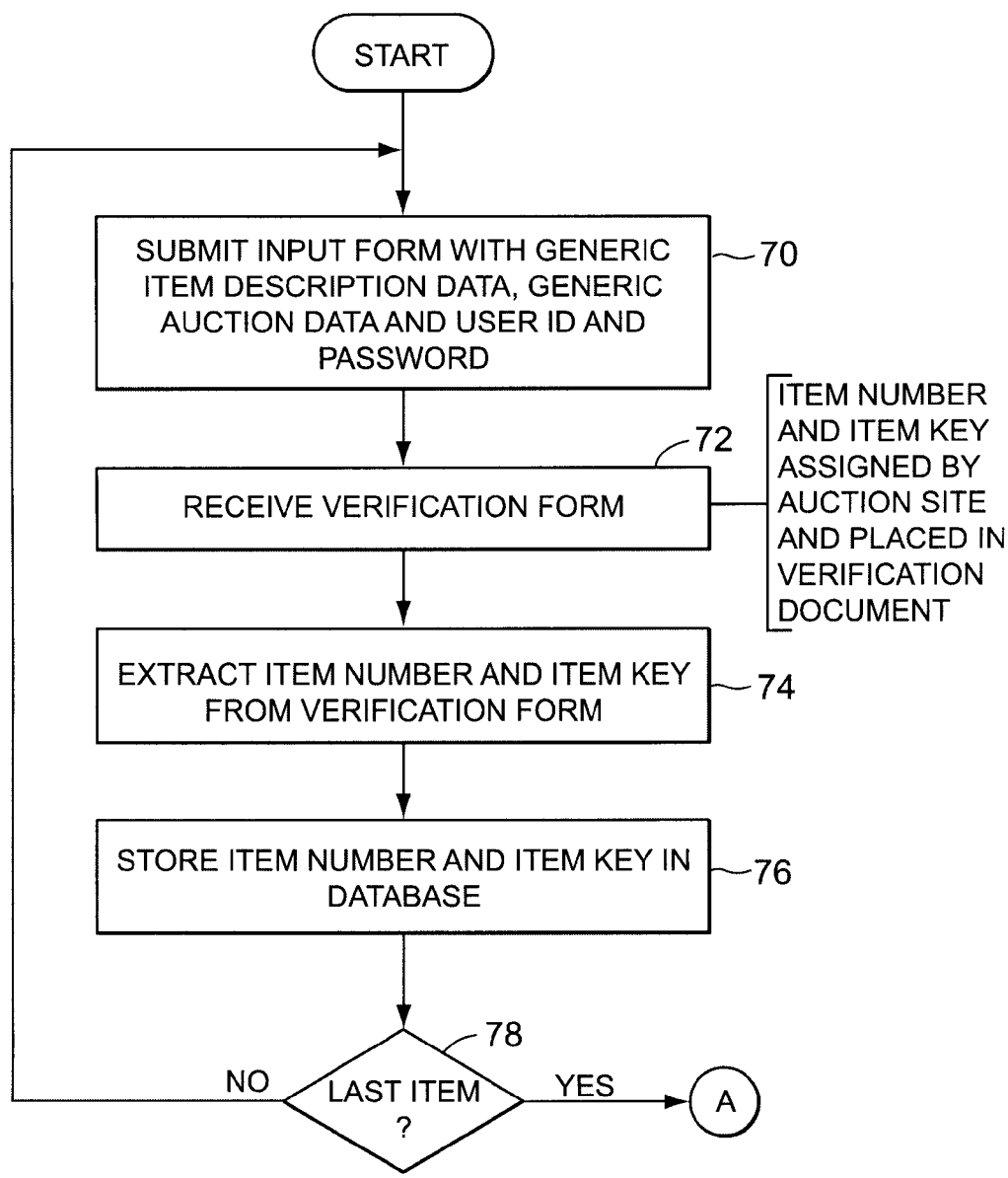
FIG. 4A shows a flow chart of the listing process in which an item number and item key are obtained in accordance with the present invention.
Figure 4B:
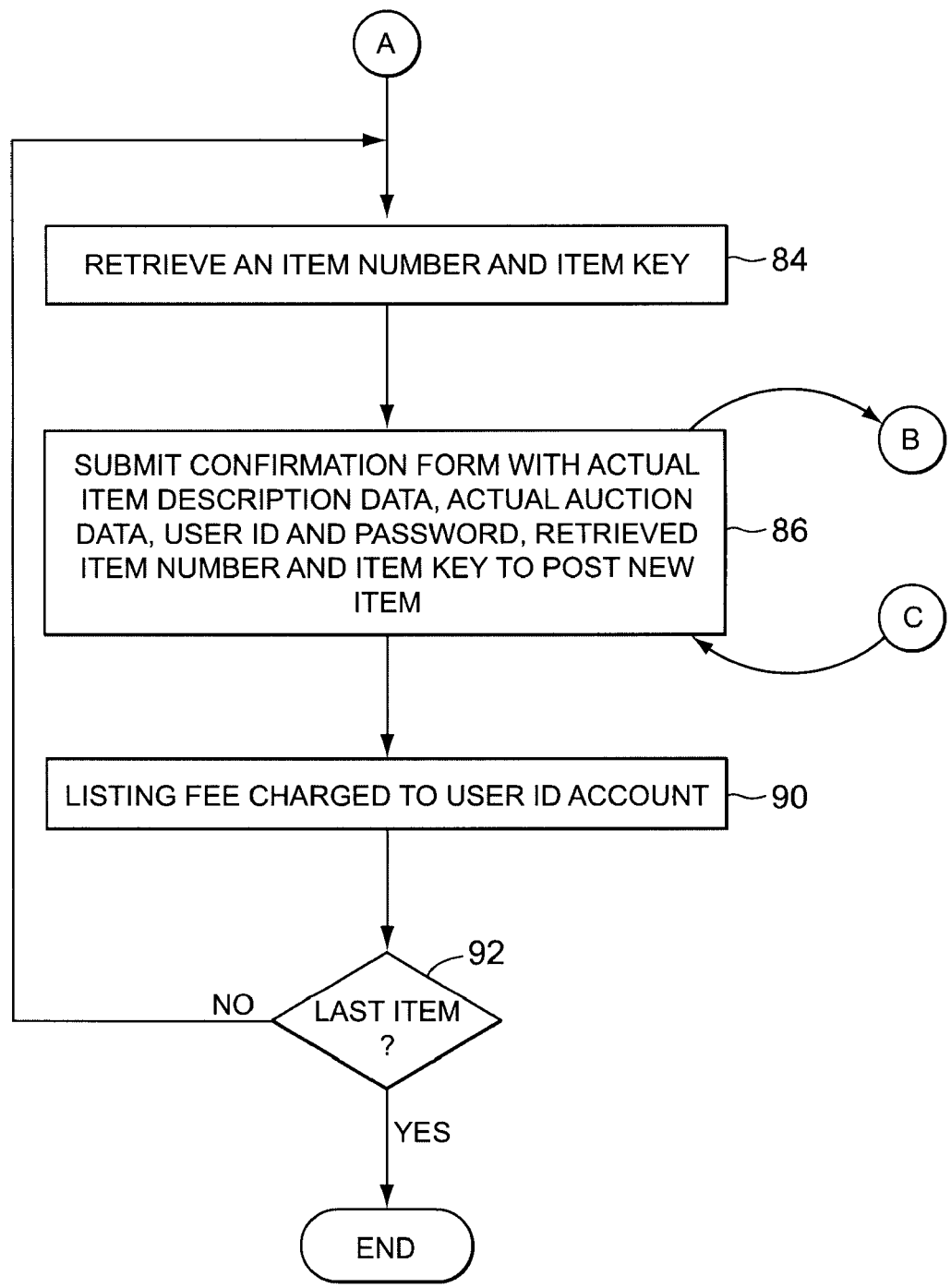
FIG. 4B shows a flow chart of the listing process in which an item is listed using a stored item number and item key.

FIGS. 4A and 4B show a flow chart of the listing process in which an item number and item key are obtained in accordance with the present invention. These figures show that the process of obtaining the item number and item key in FIG. 4A is separated from the process of actually listing the item for sale in FIG. 4B. In one embodiment of the present invention, the process of FIG. 4A and the process of FIG. 4B occur concurrently, the process of FIG. 4A operating as a separate task, possibly on a separate computer system, from the task for carrying out the process of FIG. 4B.

The process, shown in FIG. 4A, starts with step 70, in which an input form having generic item description data and generic auction parameter data, a valid user id and password is submitted to the auction site. The auction site responds, in step 72, with a verification form that includes the item number and item key the auction site has assigned for the item. In step 74, the item number and item key are extracted from the verification form and stored, in step 76, in a database 22 of an auxiliary server 20 such as is shown in FIG. 1. Database 22 contains a table having a plurality of rows, each of which has an item numbers, an item key, the user id and password. The process of FIG. 4A stores as many item numbers and item keys, as determined in step 78, as are needed to supply the process of FIG. 4B and is run, in one version of the present invention, if the number of items numbers in the database falls below a prescribed limit. In this version of the invention, a preset number of items numbers is obtained and stored after which the process of FIG. 4A is suspended until the number in the database falls again below the prescribed limit. In another version of the invention, the process of FIG. 4A runs continuously while the process of FIG. 4B runs.

Independently of the process in FIG. 4A, the process shown in FIG. 4B operates to access the stored item number and item keys. In step 84, a stored item number, item key, user id and user password are retrieved and, in step 86, a confirmation form is submitted to the auction site. This confirmation form includes actual item description data, actual auction parameter data, the user id, password, and the item number and item key which were retrieved from the database. Submitting the confirmation form to the auction site causes the item to be listed on the site. In one version of the invention, the submission is by means of an HTTP post command. Finally, a listing fee is charged to the user id account, in step 90.

The above steps are repeated as determined in step 92 for each item to be listed. Once a record in the database has been used to actually list an item, the database must mark the record as used.

If a seller has a large group of items to list to an auction site, a problem arises in that the loop shown in FIG. 4A causes the items to be listed at nearly the same time. This means that the all of the auctions for this large group of items also end at the same time. Because a large fraction of the total number of bids occur within the last 2 minutes of an auction, the chances of maximizing the final bid price for each item in the large group is diminished when all of the auctions for the large group end nearly simultaneously.

The present invention has a process for handling the listing of a large group of items. This process is the scheduling process shown in FIG. 4C. The scheduling process first presents the seller with a list of items scheduled to be listed to an auction site along with the total number of items in the list in step 94. Next, the seller selects the a time period over which these items are to be listed, called the listing time span in step 95. Typical time periods are 1 hour, 2 hours or 3 hours. Next, in step 96, the process computes the number of items to be listed each minute of the selected listing time span. For example, if there are a 90 items scheduled to be listed and the listing time span is 3 hours (180 minutes), then 1 item will be listed every 2 minutes of that 3 hours, thereby staggering the starting times and ending times by 2 minutes for each of the auctions. (Each auction on the auction site has a fixed duration.) After choosing the listing time span, the process next presents, in step 97, the seller with a choice of time slots during a 24 hour cycle that the listing time span should start and informs the seller of the ending time slot for any previously posted large group of items. Thus, if 3 hour listing time span is chosen, that time span could be selected to start at 11:00 a.m. and end at 2:00 p.m., which defines a 3 hour time slot during the day. This latter choice of time slots during the day is especially helpful to the seller because the choice of time slot helps the seller prevent a new large group of items from ending at the same time as the already posted large group of items. Finally, in step 98, the items are listed in accordance with the computed number of items to be listed in a unit time (say, a minute) and the selected time-of-day time slot.

Figure 4C:
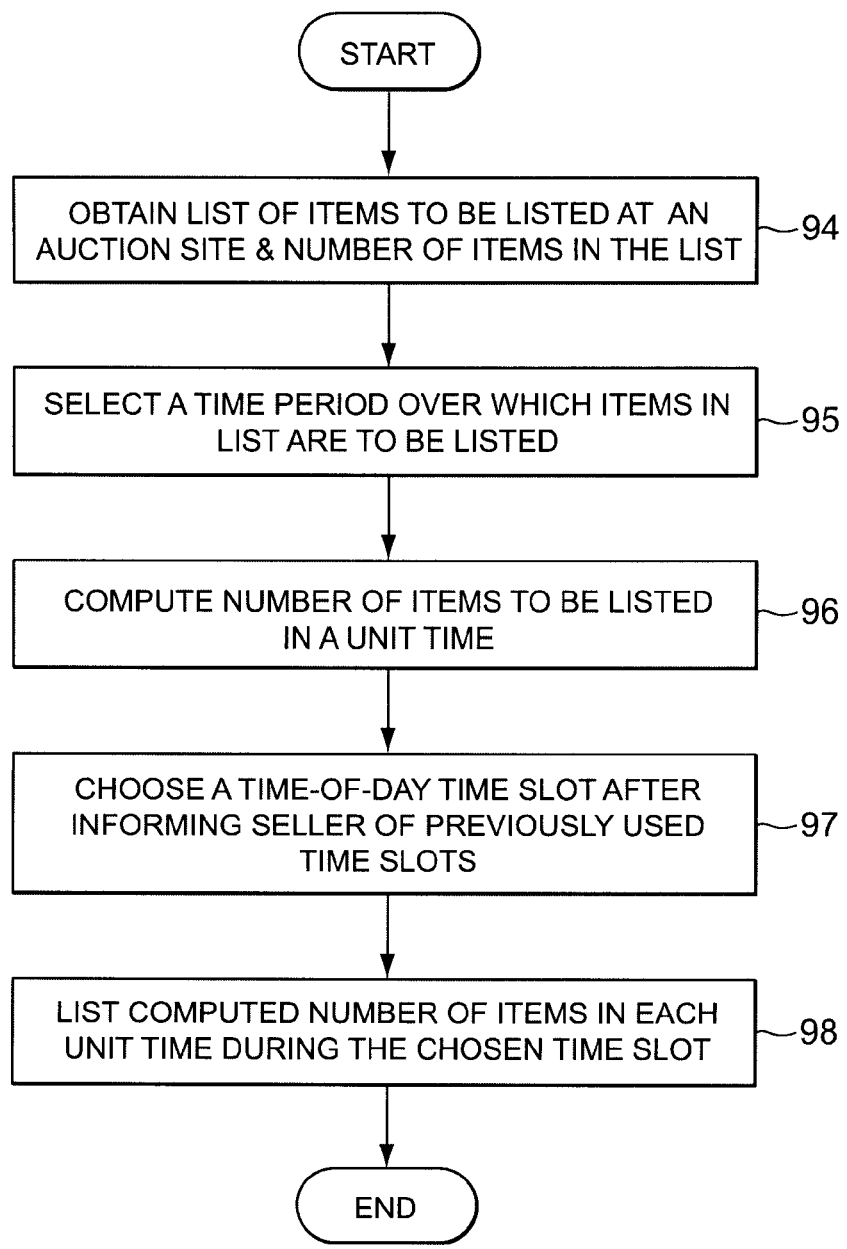
FIG. 4C shows a flow chart of a scheduling process for listing a large group of items.
Figure 4D:
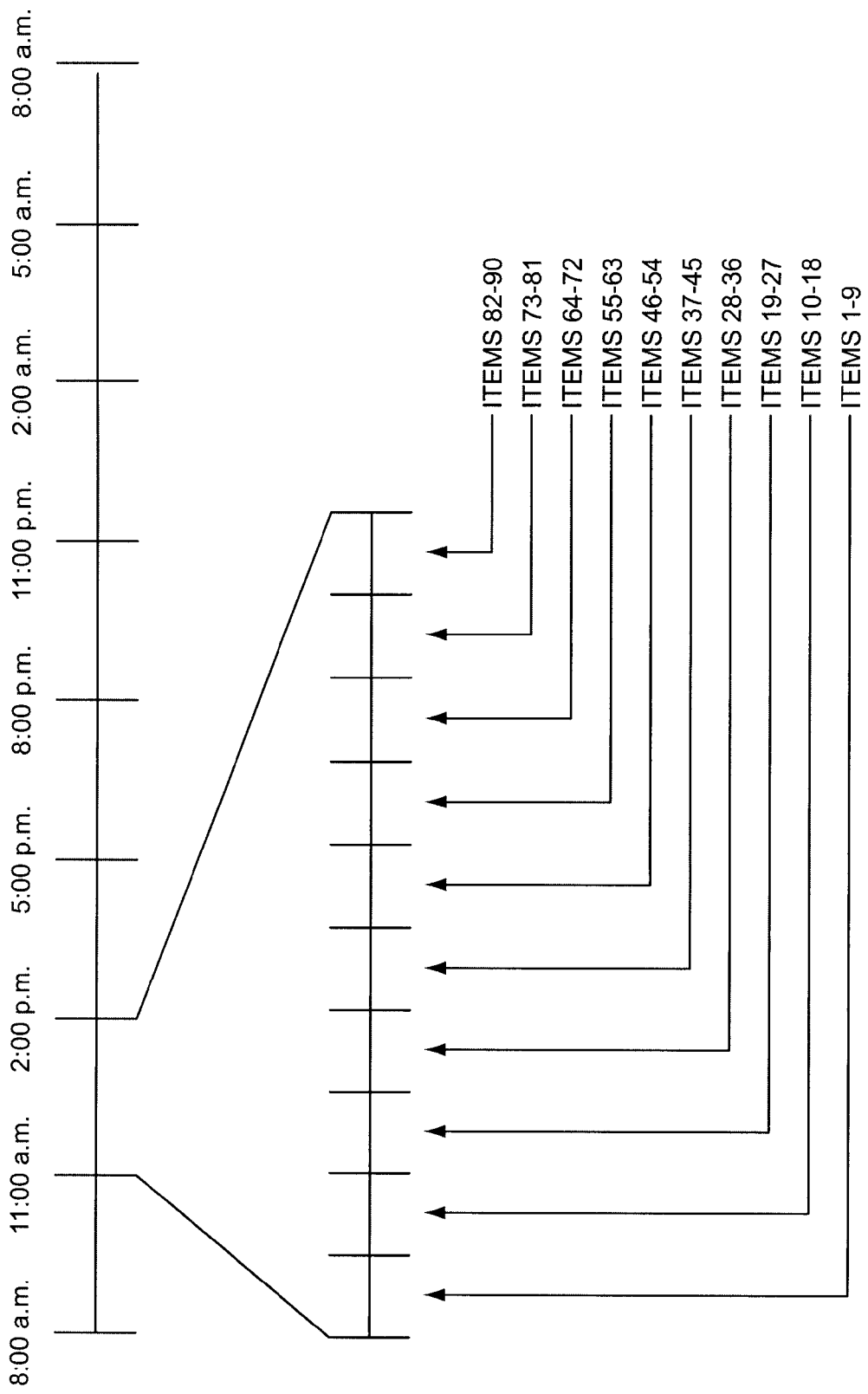
FIG. 4D illustrates aspects of the scheduling process of FIG. 4C.

FIG. 4D shows a possible scenario under the scheduling process of FIG. 4C. A time-of-day time slot of 11:00 a.m. to 2:00 p.m. is chosen (perhaps because it does not conflict with another time slot) and ninety items are listed during that three hour period. During the first 18 minutes items 1–9 are listed. During the last 18 minutes, items 82–90 are listed.

Thus the above scheduling process therefore helps to improve the number of bids that a seller may receive on any particular auction because fewer auctions expire at the same time.

Figure 5A:
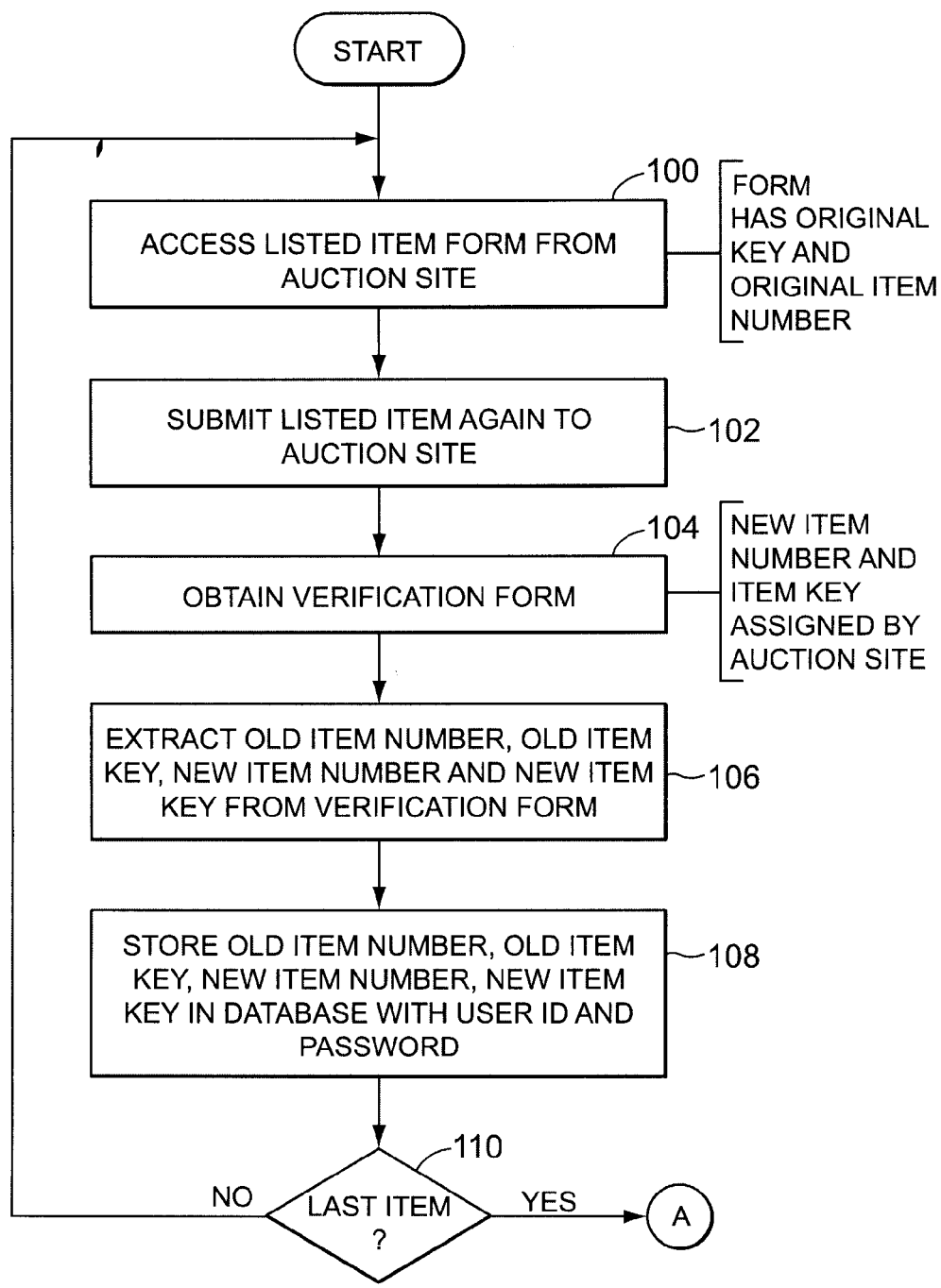
FIG. 5A shows a flow chart of the re-listing process in which a new item number and item key are obtained in accordance with the present invention.

FIG. 5A shows a flow chart of the re-listing process in which a new item number and item key are obtained for re-listing an item. In this case, the listed item form is accessed from the auction site in step 100, the listed item being one that was originally listed but did not sell in an auction for that item. In some cases, such items can be retrieved from the auction site up to about 30 days after the auction in which they failed to sell. The listed item form has the original item number and original item key. Next, in step 102, the listed item is again submitted to the auction site The item description in the input-listing form can be either the original item description information or generic item description information. In step 104, the auction site responds with a verification form having a new item number and item key for re-listing the item. The original item number, original item key, new item number and new item key are then extracted in step 106 from the form and, in step 108, are stored in a table of the database with the user id and password. The table in the database for the re-listing item numbers (i.e., the new item numbers for re-listing) is kept separate from the table in the database for the first listed item numbers. The process is repeated until all the items listed that did not sell have been accessed, as determined in step 110. Using re-listing item numbers for items that are sure to sell helps save listing fees so it is important to keep re-listing item number separate from original listing numbers. In one version of the invention, the process of FIG. 5A runs when the number if re-listing numbers in the database falls below a prescribed limit and is suspended after obtaining a preset number of re-listing numbers, if possible. In another version of the invention, the process of FIG. 5A runs continuously while the process of FIG. 5B runs.

Figure 5B:
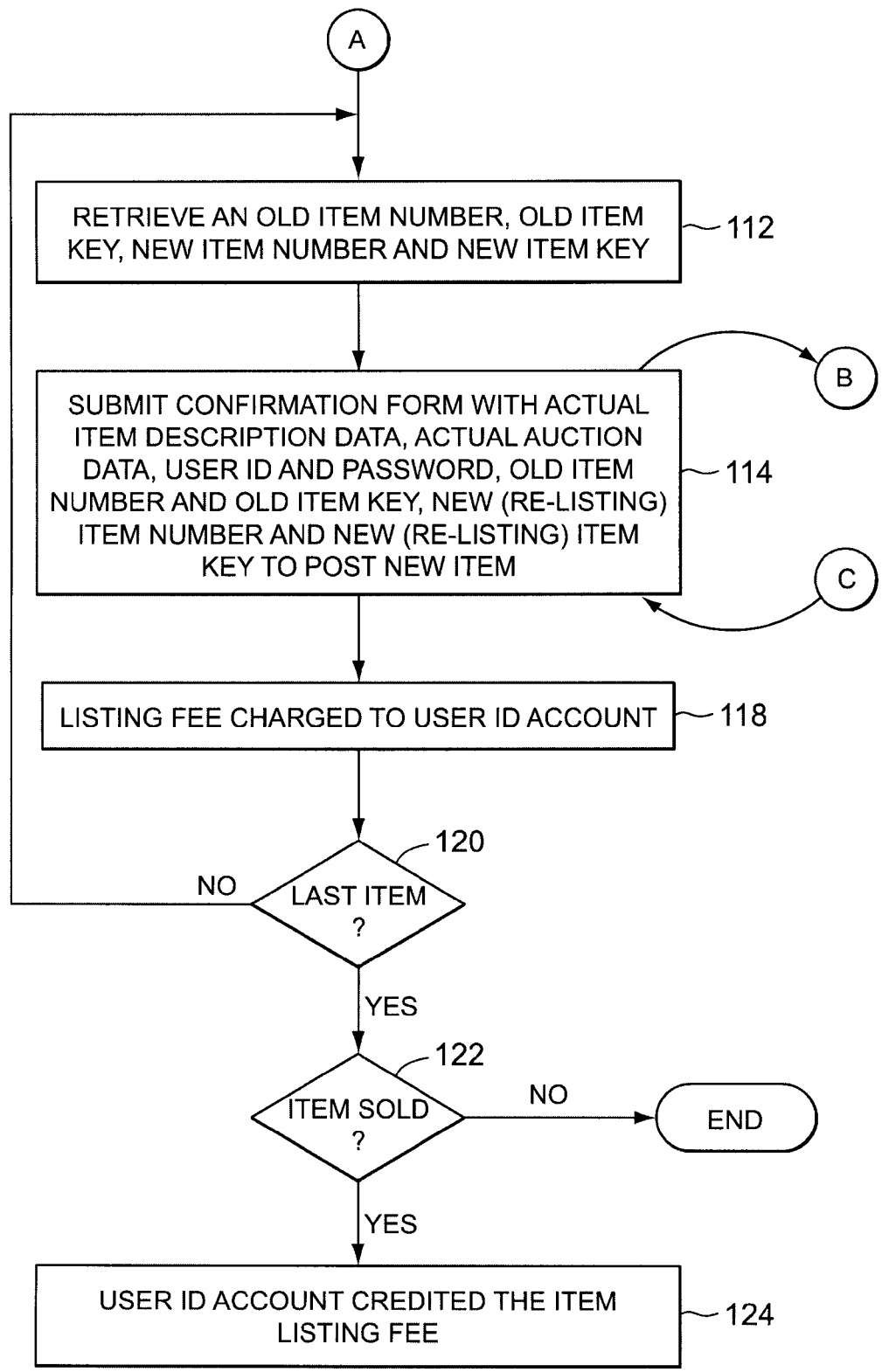
FIG. 5B shows a flow chart of the listing process in which an item is listed using a stored re-listing item number and item key.

FIG. 5B shows a flow chart of the listing process in which an item is listed using a stored re-listing item number and item key. Again, as above, this process can occur concurrently with the process of FIG. 5A for acquiring the re-listing item numbers. First, in FIG. 5B, an re-listing record is retrieved from the table in the database in step 112. This record contains the original item number, the original item key, the new item number and item key, user id and password. Next, in step 114, an confirmation form with actual item description data, actual auction parameter data, the user id and password, original item number, original item key, new item number and new item key, is submitted causing the item to be listed at the auction site under a re-listing number. It should be noted that the item being re-listed does not have to be the same item as the original item that did not sell. All that is required is that the item numbers, item keys, user id and password be consistent with each other. In step 118, a listing fee is charged to the user id account and the process is repeated, as determined in step 120, for each item to be listed using re-listing numbers. Finally, if an item listed under a re-listing number is sold, a credit is applied to the user id account under which the item was listed.

FIG. 6 shows flow chart for creating a linked description in accordance with the present invention. In step 86 of FIG. 4B and step 114 of FIG. 5B, a linked description of an item is permitted instead of a standalone description. FIG. 6 and FIG. 8 show alternatives for creating linked descriptions. In FIG. 6, if a link to other items is desired, as determined in step 130, search keywords are placed in the item description using their ASCII code equivalents, in step 132. This keeps these keywords out of the auction site's search index, thus preventing a bidder who searches for a keyword from seeing the other keywords in the item description of the item returned in the search results.

Figure 7:
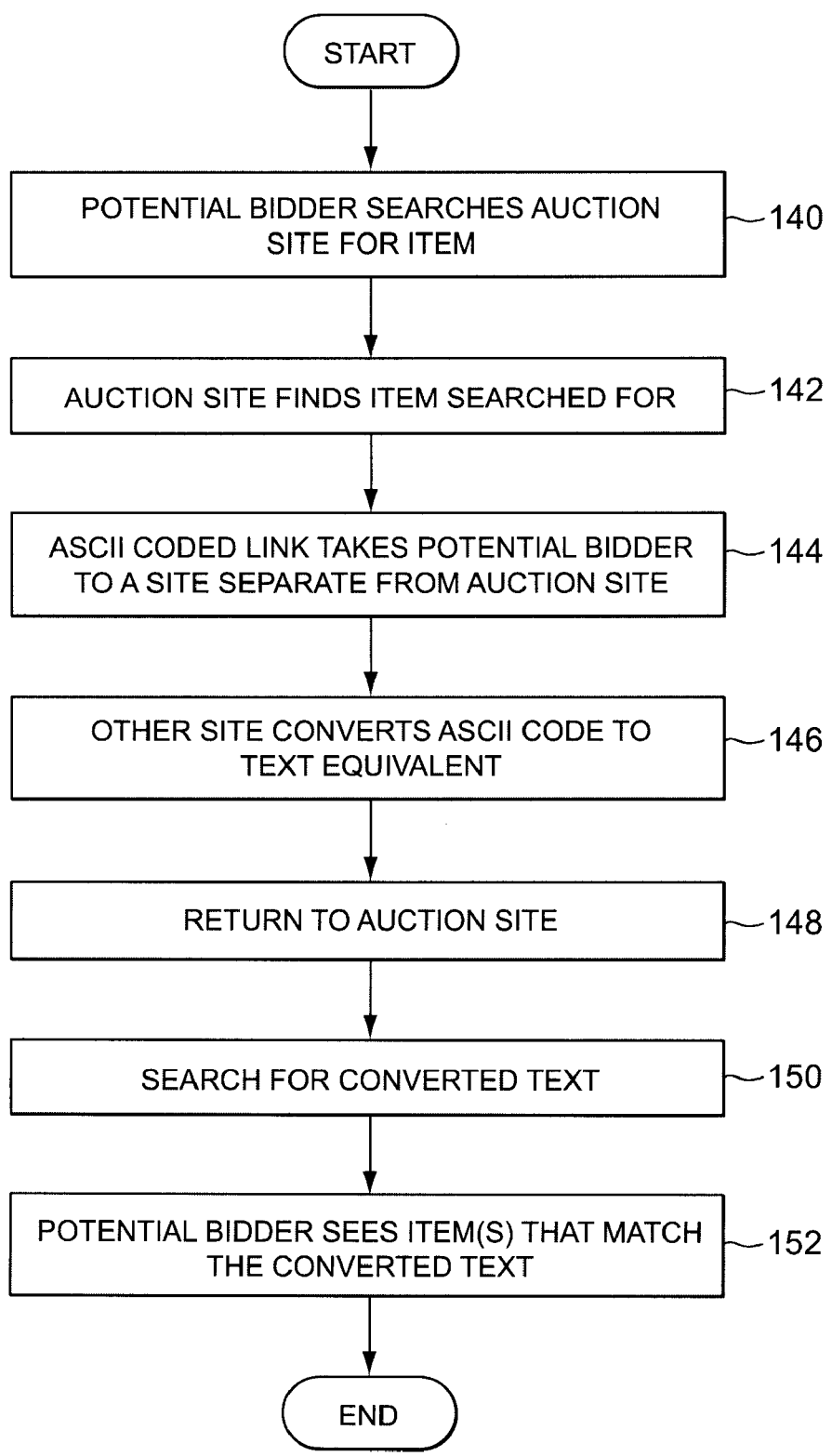
FIG. 7 shows a flow chart in which a search of the auction site uses the linked description created in FIG. 6.

FIG. 7 shows a flow chart in which a search of the auction site uses the linked description created in FIG. 6. In step 140, a potential bidder searches the auction site for an item and in step 142, the site returns a match. In step 144, an URL (uniform resource locator) with an ASCII coded keyword takes the potential bidder to the auxiliary site 20 in FIG. 1 and that site converts the ASCII coded keyword to its text equivalent and, in step 148, automatically, invokes the search engine of the auction site with the key word as the search parameter, in step 150. The potential bidder thus sees the item(s) that matches the converted text when the search engine returns with its search results, in step 152.

FIG. 8 shows a flow chart for creating an alternate linked description in accordance with the present invention. In FIG. 8, if a link to other listed items is desired, as determined in step 160, rather than change the keyword to ASCII in the item description, an HTML tag for an in-line frame is inserted into the item description in step 162.

Figure 9:
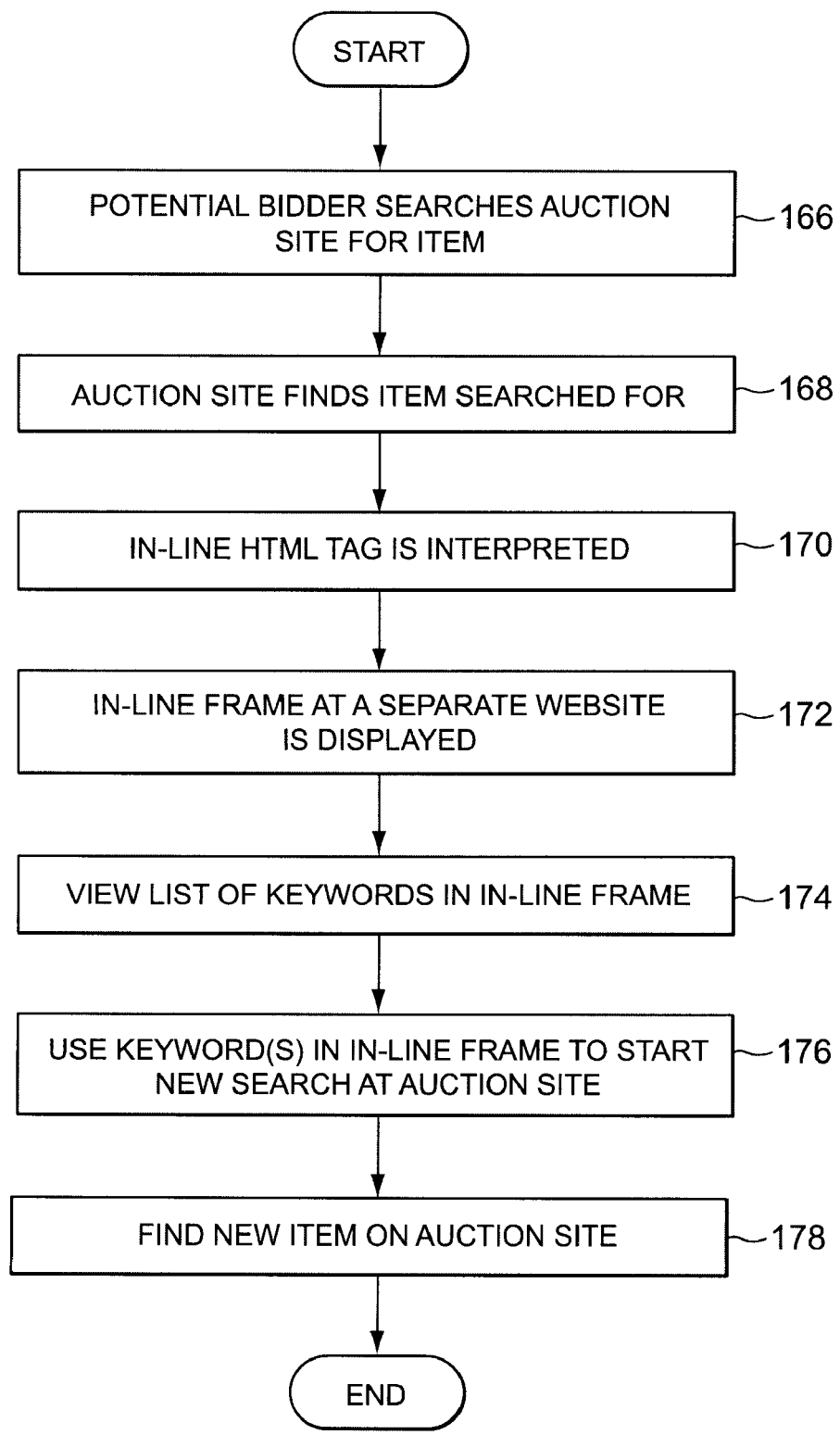
FIG. 9 shows a flow chart in which a search of the auction site uses the linked description created in FIG. 8.

FIG. 9 shows a flow chart in which a search of the auction site uses the linked description created in FIG. 8. In FIG. 9, the potential bidder searches the auction site, in step 166, for an item. The auction site, in step 168, finds the item searched for and, in step 170, returns a document having an in-line HTML tag to the potential bidder's computer system which interprets the tag. Interpreting the tag causes, in step 172, the potential bidder's computer system to create an in-line frame and to obtain from the auxiliary site 20 and display a list of keywords in the in-line frame, in step 174. The potential bidder now selects a keyword in the in-line frame, in step 176, to cause a new search at the auction site, which, in step 178, will find and retrieve the linked item on the auction site.

As an alternative to using linked item descriptions to help the potential bidder find items related to an item searched for and to avoid the waste of time in performing repeated similar searches after the item searched for is reviewed in detail, the present invention also contemplates the use of background searches of the auction site. These background searches are conducted by a Web browser "plug-in", stand-alone client side application, or framed Web page, which is triggered when the potential bidder conducts an original search for a particular item on the auction site. Generally, the original search produces hundreds or thousands of results and these results are lost when the user examines one of the items in detail. The background search, when triggered, corrects this problem by searching for items up for auction on the auction site that are similar to the item shown on the potential bidder's screen and by preparing a list of hyperlinks for the potential bidder from this background search information. The potential bidder then selects one of the hyperlinks and is taken to the auction relating to the item whose hyperlink was selected. When the potential bidder views that item, the process repeats itself, conducting another search in the background for items related to the one currently being viewed by the potential bidder.

Search results from the background search are either narrowed or expanded. To narrow the search results a filter is set up based pre-defined search parameters that the potential bidder has stored at the Web site which conducts the background search. This permits the site to filter out search results that do not interest the potential bidder.

The search can be expanded by having auction sellers register at an auxiliary Web site (i.e., a site which is not the auction site). Using this registration information a background search is conducted over the entire World Wide Web for items that the registered seller is selling and a database for that seller is compiled. This database is presented to the potential bidder when the bidder selects an auction of that seller.

Filters for the background search data include but is not limited to selecting search data that matches a category of item, a specific seller such as the seller for the originally sought item and specific auction starting and ending times.

It is contemplated that an auxiliary Web site receive instructions for performing a search from the computer of the potential bidder. The auxiliary Web site conducts the search for the potential bidder and returns the results to the potential bidder. The auxiliary Web site maintains a database that stores these background search results, cumulatively, for possible later use, until the potential bidder ends the session.

Although the present invention has been described in considerable detail with reference to certain preferred versions thereof, other versions are possible.

One alternative method for linking item descriptions includes encrypting the other items' information including descriptions, phrases, and titles. In one method, the encrypted information is inserted into an URL that takes the user to an auxiliary site at which a client-side program, such as a Java script program, runs to decrypt the other item descriptions and present the user with a selection list in readable text. Making a selection causes the user to return to the search engine of the auction site which will find and display the item selected. Instead of residing on an auxiliary site, the program for decrypting the keyword information can reside at the auction site, or even in the item description itself in the case of self-decryption. If the auction site encrypts and decrypts the other item information, there is no need to leave the auction site. The auction site encrypts the other item description data to prevent the auction site search engine from interfered with during a search for an item selected by the user. When the item requested by the user is found, the encrypted data in the item description of the found item is found automatically decrypted and presented to the user, giving the user the choice of selecting the other items for searches.

Another alternative method for linking item descriptions includes creating a keyword in the item description data, wherein the keyword's letters are separated by a delimiter such as a space, underline, comma or period so that the auction site's search engine cannot find the keyword when a search is requested. For example, if the requested item was "U.S. Automobile classics" and the seller want to inform the potential buyer of a related item such as a Jaguar that he has listed on the auction site, a delimited sequence, "J-a-g-u-a-r" is embedded in the item description for the "U.S. Automobile classics". This prevents the auction site search engine from finding the Jaguar item in a search because the delimiters prevent a match. A program resides either on the auction site or on another site to remove the delimiters from the keyword and then pass the non-delimited keyword back to the search engine of the auction site. The auction site search engine then displays the item related to the keyword.

Yet another alternative method for linking item descriptions includes entering keywords into an item's description data and then inserting those keywords into the auction site's database in a table (or in pre-designated fields of an existing table) set up for storing keywords. The table maintains an associative link with the item data in the auction site's database. When a search is performed at the auction site and the item is found, the table of keywords is called up and the related keywords are displayed along with the found item's description data. The searcher selects one of the keywords and is re-directed to the auction site's search engine with the selected keyword as the search parameter.

Yet another alternative method for linking item descriptions includes embedding other item keywords between HTML tags or other protected area specifically designed for keywords. The auction site's search engine is configured to ignore information in the protected area. The keyword information is stored in a keyword table (or in pre-designated fields of an existing table) set up for keywords. When a search is performed at the auction site and the item is found, the table of keywords (or keyword fields) is called up and the related keywords are displayed along with the found item's description data. The searcher selects one of the keywords and is re-directed to the auction site's search engine with the selected keyword as the search parameter.

Yet still another alternative method for linking item descriptions includes placing a pointer, such as an URL inside the item description, where the pointer is used to access an auxiliary host connected to the Internet. When a Web page containing the item description having the pointer is accessed by the potential bidder's browser (or equivalent interpreter), the pointer accesses the auxiliary host to produce an auxiliary list of keywords, item descriptions and/or item numbers that represent all of the currently active auctions for the sellers items and displays the list inside the auction description. The list from the auxiliary host can also be displayed in a pop-up window generated when the URL is selected and displayed over the Web page containing the item description from the auction site.

The auxiliary list is preferably dynamic in that it can be changed at any time so that the list is always up-to-date when viewed. This means that when an auction for one or more items ends, the list is updated to only show currently active auctions. Because the list resides on the auxiliary host, the information in the list is not visible to and so does not interfere with the auction site search engine. A variation of the above alternative is that the auction site has Java, Java-Script or similar code inside the item description on the auction site. This code when executed allows the potential bidder's browser to have access to the dynamic list of items on the auxiliary site. Thus, code for displaying the dynamic list of items can reside on the client side, i.e., with the browser or on the auxiliary site.

Therefore, the spirit and scope of the appended claims should not be limited to the description of the preferred versions contained herein.

What is claimed is:

1. A method of presenting to a user on an auction site one or more action items related to a linking auction item, comprising:
   encoding search information for one or more related auction items available by a seller;
   embedding the encoded search information into a pointer to a facilitating server, the linking auction item and the one or more related auction items being available by the same seller, wherein an auction item is an item available on an auction site;
   embedding said pointer in an item description of the linking auction item;
   upon selection of the linking auction item at the auction site by a user, receiving the encoded search information embedded in the pointer to the facilitating server;
   automatically decoding the encoded search information embedded in said pointer into a keyword; and
   invoking a search engine of the auction site with the keyword as a search parameter to find and present to the user item documents for the one or more related auction items.

2. A method of presenting, as recited in claim 1, wherein the facilitating server is associated with an auxiliary site accessible on a computer network.

3. A method of presenting, as recited in claim 1, wherein the facilitating server is associated with the auction site.

4. A method of presenting, as recited in claim 1, wherein the encoded search information is ASCII-coded.

5. A method of presenting, to a user on an auction site one or more auction items related to a linking auction items related to a linking auction item, comprising:
   embedding an HTML tag into a document on the auction site, the auction site document describing the linking auction item available by the seller, and the linking auction item and the one or more related auction items having the same seller, wherein an auction item is an item available on the auction site;

upon selection of the linking item at the auction site by a user, receiving and interpreting the embedded HTML tag;

causing in response to the interpreted HTML tag, the user to be presented with an in-line frame and a list of keywords displaying therein, the keywords obtained from a facilitating server;

receiving a selection by the user of one of the keywords in the list; and in response to the selection, invoking a search engine of the auction sire using the selected keyword as a search parameter to find and present to the user item documents for the one or more related auction items.

6. A method of presenting, as recited in claim 5, wherein the facilitating server is associated with an auxiliary site accessible on a computer network.

7. A method of presenting, as recited in claim 5, wherein the facilitating server is associated with the auction site.

8. A method of presenting to a user on an auction site one or more auction items related to a linking auction item, comprising:

encrypting search information for the one or more related auction items available by a seller;

embedding the encrypted search information for the one or more related auction items into a pointer to a facilitating server, the linking auction item and the one or more related auction items being items available by the same seller, wherein an auction item is an item available in an auction site;

embedding said pointer in an item description of the linking auction item;

upon selection of the linking item at the auction site by a user, receiving the encrypted search information embedded in the pointer to the facilitating server;

automatically decrypting the encrypted search information embedded in said pointer into item description information of the one or more related auction items; and invoking a search engine of the auction site with the description information as search parameters to find and present to the user item documents for the one or more related auction items.

9. A method of presenting to a user on an auction site one or more auction items related to a linking auction item available by a seller, comprising:

forming a delimited keyword by separating one or more characters of a keyword by one or more delimiters;

embedding the delimited keyword into a pointer to a facilitating server, wherein the linking auction item and the one or more related auction items are items available by the same seller and wherein an auction item is an item available on an auction site;

embedding said pointer in an item description of the linking auction item, wherein the delimited keyword prevents a search engine of the auction site from finding the keyword in the item description when a search at the auction site is conducted;

upon selection of the linking auction item by the user at the auction site, receiving the delimited keyword at the facilitating server;

automatically removing any delimiters from the delimited keyword to recover the keyword; and invoking a search engine of the auction site with the recovered keyword as a search parameter to find and present to the user item documents for the one or more related auction items.

10. A method of presenting, as recited in claim 9, wherein the facilitating server is associated with the auction site.

11. A method of presenting, as recited in claim 9, wherein the facilitating server is associated with an auxiliary site accessible on a computer network.

12. A method of presenting to a user on an auction site one or more auction items related to a linking auction item available by a seller, comprising:

embedding one or more keywords relating to one or more related auction items into a linking auction item's description, wherein the linking auction item and the one or more related auction items are items available by the same seller and wherein an auction item is item available on an auction site;

inserting said one or more keywords into a table residing in a facilitating server and configured for storing keywords, wherein said table includes an associative link between each of said one or more keywords in the table and one or more auction items at the auction site;

upon finding the linking action item at the auction site by a user, retrieving the table of keywords from the facilitating server;

presenting to the user the keywords in the table along with description data of the linking auction item; and upon selection of one of the displayed keywords by the user, invoking a search engine of the auction site with the keyword as a search parameter to find and present to the user item documents for the one or more related auction items.

13. A method of presenting, as recited in claim 12, wherein the facilitating server is associated with the auction site.

14. A method of presenting, as recited in claim 12, wherein the facilitating server is associated with an auxiliary site accessible on a computer network.

15. A method of presenting to a user on an auction site one or more auction items related to a linking auction item, comprising:

embedding one or more keywords into a protected area of a document describing a linking auction item available by a seller, wherein the linking auction item and the one or more related auction items are items available by the same seller, and wherein an auction item is an item available on an auction site, a search engine at the auction site is configured to ignore information in the protected area;

inserting said one or more keywords into a table residing in a facilitating server and configured for storing keywords;

upon finding the linking auction item at the auction site by the user, retrieving the table of keywords stored on the facilitating server;

presenting to the user the keywords in the table along with the description data of the linking auction item; and upon selection of one of the displayed keywords by the user at the auction site, invoking a search engine of the auction site with the keyword as a search parameter to find and present to the user item documents for the one or more related auction items.

16. A method of presenting, as recited in claim 15, wherein the facilitating server is associated with the auction site.

17. A method of presenting, as recited in claim 15, wherein the facilitating server is associated with an auxiliary site accessible on a computer network.

18. A method of presenting to a user on an auction site one or more auction items related to a linking auction item, comprising:
   embedding a pointer in an item description of a linking auction item available by a seller, the item description when accessed at the auction site causing an access to a facilitating server by means of the embedded pointer, the linking auction item and the one or more related auction items being items available by the same seller, wherein an auction item is an item available on an auction site;
   upon accessing the item description having the embedded pointer, obtaining at the facilitating server a list of item descriptions and item numbers that represent the currently active auction items of the same seller; and
   presenting to the user the list of the seller's currently active auction items.

19. A method of presenting, as recited in claim 18,
   further comprising, upon selection of the linking auction item at the auction site by a user, generating a pop-up window to the user; and
   wherein the list of currently active auction items of the seller is presented in the pop-up window.

20. A method of presenting, as recited in claim 19, wherein the pop-up window is displayed over a Web page containing the item description from the auction site.

21. A method of presenting, as recited in claim 18, wherein the list is automatically updated by the facilitating server to show only the currently active auctions.

22. A method of presenting, as recited in claim 18, wherein the facilitating server is associated with the auction site.

23. A method of presenting, as recited in claim 18, wherein the facilitating server is associated with an auxiliary site accessible on the computer network.

24. A method of presenting, as recited in claim 18, wherein the list obtained from the facilitating server includes keywords relating to the one or more related items.

25. A method of presenting, as recited in claim 18, further comprising, upon selection by the user at the auction site of one of the items in the presented list, invoking a search engine of the auction site to find and present to the user an item document for the selected item.

26. A method of presenting, as recited in claim 18, wherein the pointer is a URL.

27. A method of presenting, as recited in claim 18, wherein the step of obtaining a list of item descriptions and item numbers is performed by the facilitating server executing the code residing at the facilitating server.

28. A method of presenting, as recited in claim 18,
   wherein the item description of the linking item includes embedded executable code; and
   wherein the step of obtaining a list of item descriptions and item numbers is performed by the facilitating server executing the code embedded in the linking item description.

29. A method of presenting, as recited in claim 28, wherein the executable code is Java code.

30. A method of presenting, as recited in claim 28, wherein the executable code is Java Script.

31. A method of presenting, as recited in claim 2, wherein the computer network is the Internet.

32. A method of presenting, as recited in claim 6, wherein the computer network is the Internet.

33. A method of presenting, as recited in claim 11, wherein the computer network is the Internet.

* * * * *